(12) United States Patent
Herrema, III

(10) Patent No.: US 11,734,402 B2
(45) Date of Patent: Aug. 22, 2023

(54) SYSTEM AND METHOD FOR USER AUTHENTICATION BASED ON PASSIVE BIOMETRICS

(71) Applicant: BlackBerry Limited, Waterloo (CA)

(72) Inventor: John Raymond Herrema, III, Palo Alto, CA (US)

(73) Assignee: BlackBerry Limited, Waterloo (CA)

( * ) Notice: Subject to any disclaimer, the term of this patent is extended or adjusted under 35 U.S.C. 154(b) by 176 days.

(21) Appl. No.: 17/083,727

(22) Filed: Oct. 29, 2020

(65) Prior Publication Data
US 2022/0138293 A1 May 5, 2022

(51) Int. Cl.
*G06F 21/32* (2013.01)

(52) U.S. Cl.
CPC .................................. *G06F 21/32* (2013.01)

(58) Field of Classification Search
None
See application file for complete search history.

(56) References Cited

U.S. PATENT DOCUMENTS

| | | | | |
|---|---|---|---|---|
| 2014/0112553 | A1* | 4/2014 | Yamaguchi | G06V 40/172 382/118 |
| 2016/0110528 | A1* | 4/2016 | Gupta | H04W 12/06 726/19 |
| 2020/0273040 | A1 | 8/2020 | Novick et al. | |

FOREIGN PATENT DOCUMENTS

WO 2016060738 A1 4/2016

OTHER PUBLICATIONS

EPO: Extended European Search Report relating to EP application No. 21200775.1, dated Mar. 1, 2022.
Wang et al.: "Towards continuous and passive authentication across mobile devices", Security and Privacy in Wireless and Mobile Networks, ACM, 2 Penn Plaza, Suite 701 New York, NY 10121-0701 USA; XP05370804, dated Jul. 18, 2017.
Mohammed et al.: "Sensor-Based Continuous Authentication of Smartphones' Users Using Behavioural Biometrics: A Contemporary Survey", vol. 8, No. 1, pp. 65-84, XP055892422, retrieved from the internet: https://arxiv.org/pdf/2001.08578.pdf; dated May 10, 2020.

* cited by examiner

*Primary Examiner* — Nicholas J Lee
(74) *Attorney, Agent, or Firm* — Rowand LLP (57) ABSTRACT

A computer-implemented method is disclosed. The method includes: receiving, via an input interface associated with an electronic device, a first user input; identifying a first device class based on a current usage mode of the electronic device and a first set of device property values associated with the current usage mode of the electronic device; obtaining normalized values of input features associated with the first user input, the input feature values being normalized based on representative device property values that are defined for the first device class; and performing authentication of a user of the electronic device based on the normalized input feature values associated with the first user input.

17 Claims, 5 Drawing Sheets

SYSTEM AND METHOD FOR USER AUTHENTICATION BASED ON PASSIVE BIOMETRICS

TECHNICAL FIELD

The present disclosure relates to electronic devices and, in particular, to systems and methods for authenticating users of electronic devices based on biometrics.

BACKGROUND

Authentication systems may be classified as active, passive, or a combination of both. An active authentication system requires user actions for the purpose of authentication, whereas a passive authentication system verifies the identity of a user without requiring specific additional actions. In passive authentication systems, a user's activities, behavior, or other observable data are collected and analyzed for evidence of identity without explicit user activity or input (e.g. input of identification data, active scanning of fingerprint, etc.) from the user. As a specific example of passive authentication systems, passive biometrics technology generates user profiles based on inherent physiological (e.g. face recognition, etc.) and/or behavioral (e.g. touch and motion patterns, gait, voice, etc.) characteristics of the users. A trained passive biometrics engine can recognize a user based on physiological and/or behavioral patterns and learn from the user's interactions to build a custom profile for the user.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In an aspect, the present disclosure describes a computer-implemented method. The method includes: receiving, via an input interface associated with an electronic device, a first user input; identifying a first device class based on a current usage mode of the electronic device and a first set of device property values associated with the current usage mode of the electronic device; obtaining normalized values of input features associated with the first user input, the input feature values being normalized based on representative device property values that are defined for the first device class; and performing authentication of a user of the electronic device based on the normalized input feature values associated with the first user input.

In some implementations, identifying the first device class may include, for each device class in a set of predefined device classes, comparing the first set of device property values associated with the current usage mode of the electronic device with corresponding ones of the representative device property values of the device class.

In some implementations, identifying the first device class may include: for each of the predefined device classes, obtaining a similarity metric value representing overall similarity between the first set of device property values associated with the current usage mode of the electronic device and corresponding representative device property values of the device class based on the comparing; and selecting a device class associated with the highest similarity metric value as the first device class.

In some implementations, identifying the first device class may include: determining that the first set of device property values associated with the capabilities and/or current usage mode of the electronic device are not sufficiently similar to corresponding representative device properties of any one of the predefined device classes; defining a new device class based on the current usage mode of the electronic device and the first set of device property values associated with the current usage mode of the electronic device; and selecting the newly defined device class as the first device class.

In some implementations, the input interface may include a display device and the current usage mode of the electronic device may be at least one of: a current orientation of a display device; or one of windowed mode or full-screen mode for the display device.

In some implementations, the first user input may include a touch gesture input and the input feature values may include directional components of motion vectors associated with the touch gesture input.

In some implementations, the input interface may include a display device and the first set of device property values may include maximum width and height of an input area of the display device in the current usage mode of the electronic device.

In some implementations, the authentication may be performed based on historical input feature values data associated with the first device class for one or more authorized users of the electronic device.

In some implementations, the historical input feature values data for an authorized user of the electronic device may comprise a model that is trained using normalized input feature values associated with inputs by the authorized user as training data.

In some implementations, the authentication may be performed continuously or in response to a request for authentication of a user on the electronic device.

In another aspect, the present disclosure describes an electronic device. The electronic device includes a memory, an input interface, and a processor coupled to the memory and the input interface. The processor is configured to: receive, via an input interface associated with an electronic device, a first user input; identify a first device class based on a current usage mode of the electronic device and a first set of device property values associated with the current usage mode of the electronic device; obtain normalized values of input features associated with the first user input, the input feature values being normalized based on representative device property values that are defined for the first device class; and perform authentication of a user of the electronic device based on the normalized input feature values associated with the first user input.

In yet another aspect, the present disclosure describes non-transitory computer-readable media storing instructions that, when executed by a processor, cause the processor to perform operations comprising: receiving, via an input interface associated with an electronic device, a first user input; identifying a first device class based on a current usage mode of the electronic device and a first set of device property values associated with the current usage mode of the electronic device; obtaining normalized values of input features associated with the first user input, the input feature values being normalized based on representative device property values that are defined for the first device class; and performing authentication of a user of the electronic device based on the normalized input feature values associated with the first user input.

Other example embodiments of the present disclosure will be apparent to those of ordinary skill in the art from a review of the following detailed descriptions in conjunction with the drawings.

Passive biometrics technology relies on inherent physiological and/or behavioral characteristics of users for identity verification and access control. Passively collected biometrics may be used as inputs to machine learning models to enable authentication without requiring specific actions (e.g. password entry, fingerprint authentication, etc.) by users. For example, collected biometrics in modern touch-enabled devices include touch input events that represent "motions" (e.g. scroll-up, scroll-down, swipe left or right, etc.). These inputs are influenced by characteristics, such as handedness, one- versus two-handed operation preference, hand or finger length, size and strength, etc. that, taken together, are unique or nearly unique to individual users.

A challenge in building biometric models from touch inputs is that different devices may vary significantly in their physical properties and operating/usage modes. For example, touch-enabled devices may vary in device properties, such as touchscreen dimensions and support for pressure sensing, and usage in different operating modes (e.g. portrait, landscape, full-screen, and windowed modes). This variance means that authentication based on a user's touch inputs to a device is influenced not only by their unique biometric patterns, but also by the device's properties and its then-current usage mode.

If touch inputs to a device are taken "as is" (i.e. without accounting for the device's properties and/or usage modes), there may be increased risk of both "false positives" (where authorized target user is incorrectly predicted to be an unauthorized user) and, worse yet, "false negatives" (where unauthorized non-target user is incorrectly predicted to be an authorized user) when performing authentication based on modelling and subsequent prediction of inputs. More generally, failure to properly normalize user inputs to devices results in poor prediction results in authentication systems.

The proposed system of the present disclosure accounts for variances in device properties and usage modes when processing user inputs for biometric authentication. More particularly, the disclosed system implements normalization of user inputs based on dynamic definition of abstracted device classes. A small number of abstracted "device classes" are defined, allowing different devices, operating system (OS) variants, and/or usage modes to be mapped to a common abstraction. The use of "device class" abstraction as basis for normalization may yield meaningful benefits. This optimized approach to normalization of input values may avoid conflation of "real" biometric variance between users with "induced" variance driven by differences in device, OS, and/or usage mode. Further, the present solution allows multiple devices, OS variants, and/or usage modes to be mapped to a single abstracted "device class" and associated learning model, and for new classes to be dynamically defined as needed. By limiting the number of the abstracted device classes, the present system normalizes user inputs without requiring too many, often under-trained learning models to cover all possible permutations in device properties and/or usage modes.

A small number of "abstracted" device classes are defined for particular types of electronic devices. By way of example, smartphone and tablet devices may be generally divided into a set number of device classes, where differentiating device properties for the classes include maximum horizontal and vertical screen dimensions (i.e. width and height of screen) and support for generating pressure readings from processing touch inputs. When a user input (e.g. touch gesture input) is received at an input interface of the electronic device, a device class to which the electronic device is most similar is identified. More specifically, a device class for the electronic device is identified based on a current usage mode of the electronic device and device property values associated with the current usage mode when the user input is received at the electronic device. The identified device class may, for example, be one of the "abstracted" device classes which are predefined for the type associated with the electronic device. Alternatively, if the electronic device is not sufficiently similar to any of the predefined device classes, a new class may be dynamically defined for the electronic device. The new class may be defined based on the current usage mode of the electronic device and a set of device property values that are associated with the current usage mode.

The identified device class serves as a basis for normalization of user inputs on the electronic device. In particular, input feature values associated with user inputs on the electronic device are normalized based on representative device property values that are defined for the identified device class. In this way, user inputs are "normalized" to account for device properties and current usage mode(s). The normalized input feature values may be used to train a single model for the "abstracted" device class based on aggregate of all user inputs that mapped to the class, irrespective of differences in device, OS variants, and/or usage mode permutations that generated them.

Figure 1:
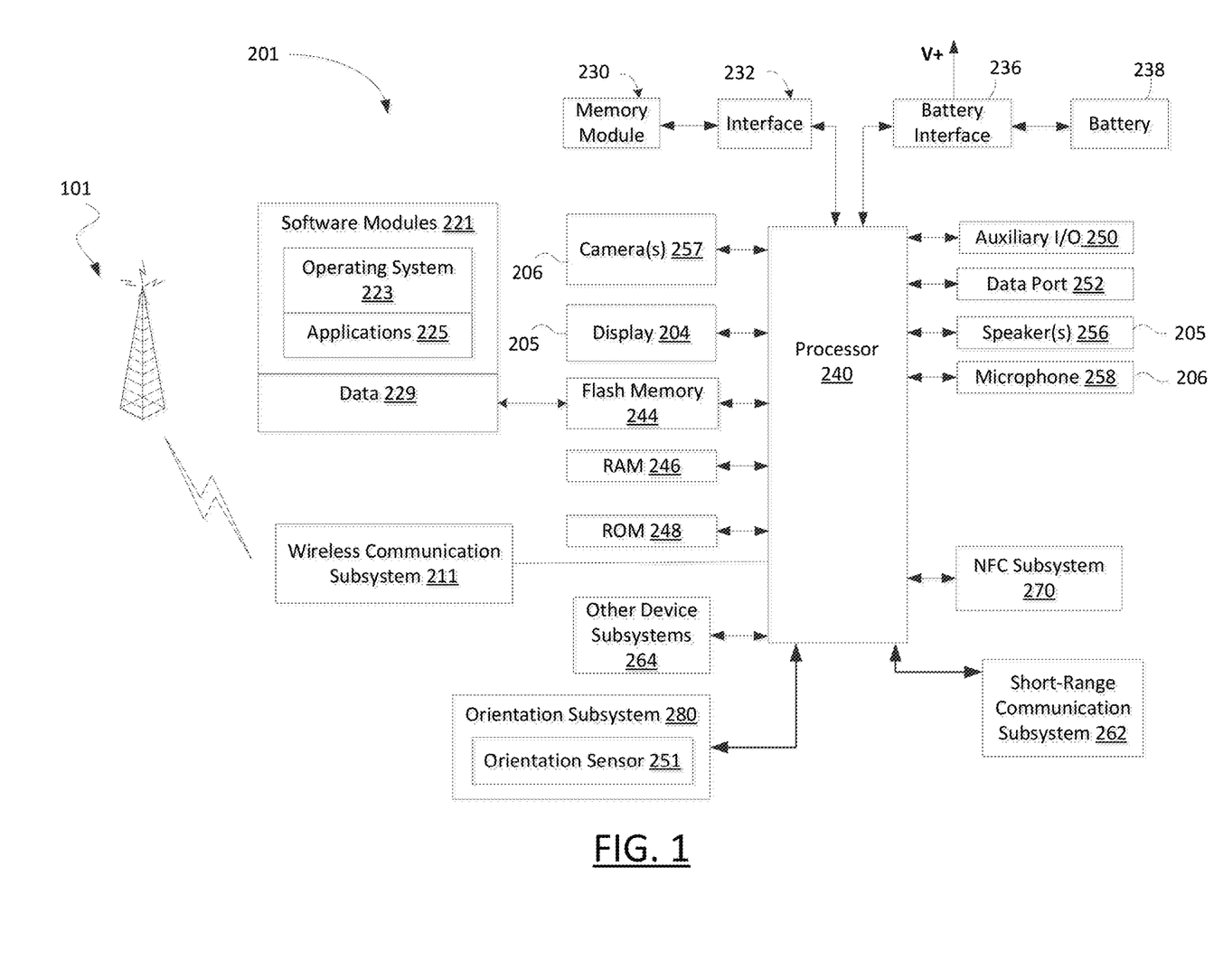
FIG. 1 is a block diagram illustrating an electronic device in accordance with example embodiments of the present disclosure.

Reference is first made to FIG. 1, which illustrates an example electronic device 201. The electronic device 201 may implement the various methods described herein. In at least some embodiments, the electronic device 201 is a communication device. More particularly, the electronic device 201 may be a mobile communication device having data and voice communication capabilities, and the capability to communicate with other computer systems. Depending on the functionalities provided by the electronic device 201, in various example embodiments, the electronic device 201 may be a multiple-mode communication device configured for data and/or voice communication, such as a mobile phone (e.g. a smartphone), a wearable computer (e.g. a smartwatch), a tablet computer (e.g. a slate computer), a personal digital assistant (PDA), or other computer system. The electronic device 201 may, in some embodiments, take a form that is different from those specifically listed above.

The electronic device 201 includes a controller including one or more processors 240 (such as a microprocessor) which controls the overall operation of the electronic device 201. The processor 240 interacts with various device subsystems, such as a wireless communication subsystem 211 for exchanging radio frequency signals with a wireless network 101 to perform communication functions. The processor 240 is communicably coupled with additional device subsystems, including one or more output interfaces 205 (such as a display 204, speaker(s) 256, etc.), one or more input interfaces 206 (such as camera(s) 257, a microphone 258, a keyboard, a navigational input device, a touch-sensitive overlay associated with a touchscreen display 204, etc.), an orientation subsystem 280, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 270, a short-range communication subsystem 262, and other device subsystems generally designated as 264. Some of the subsystems illustrated in FIG. 1 perform communication-related functions, whereas other subsystems may provide "resident" or on-device functions.

In at least some embodiments, the electronic device 201 may include a display 204 which acts as both an input interface 206 (i.e. touch-sensitive overlay) and an output interface 205 (i.e. display). The display 204 may be constructed using a touch-sensitive input surface that is connected to an electronic controller and which overlays the display 204. The touch-sensitive overlay and the electronic controller provide a touch-sensitive input interface, and the processor 240 interacts with the touch-sensitive overlay via the electronic controller. In at least some embodiments, the touch-sensitive overlay may have a touch-sensitive input surface that is larger than the display 204. For example, the touch-sensitive overlay may extend over top of a frame which surrounds the display 204. The touch-sensitive overlay may, in some embodiments, extend to the sides of the electronic device 201.

As noted above, the electronic device 201 includes a communication subsystem 211 which allows the electronic device 201 to communicate over a wireless network 101. The communication subsystem 211 may include, at least, a receiver, a transmitter, and associated components, such as one or more antenna elements, local oscillators (LOs), and a processing module such as a digital signal processor (DSP). The antenna elements may be embedded or internal to the electronic device 201 and a single antenna may be shared by both receiver and transmitter. The particular design of the wireless communication subsystem 211 may depend on the wireless network 101 in which electronic device 201 is intended to operate.

In some embodiments, the auxiliary input/output (I/O) subsystems 250 may include an external communication link or interface (e.g. an Ethernet connection). The electronic device 201 may include other wireless communication interfaces for communicating with other types of wireless networks such as, for example, an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a Global System for Mobile Communications (GSM) network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some embodiments, the electronic device 201 also includes a device orientation subsystem 280. The orientation subsystem 280 includes at least one orientation sensor 251 connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one-, two- or three-axes configurations. Higher order axis configurations are also possible. Accelerometers may produce digital or analog output signals depending on the type of accelerometer. The orientation sensor 251 may generate orientation data which specifies the orientation of the electronic device 201. The orientation data, in at least some embodiments, specifies the orientation of the device 201 relative to the gravitational field of the earth. In some embodiments, the orientation subsystem 280 may include other orientation sensors 251, instead of or in addition to accelerometers. For example, the orientation subsystem 280 may include a gravity sensor, a gyroscope, a tilt sensor, an electronic compass or other suitable sensor, or combinations thereof. In some embodiments, the device orientation subsystem 280 may include two or more orientation sensors 251, such as an accelerometer and an electronic compass.

The electronic device 201 may, in at least some embodiments, include a near field communications (NFC) subsystem 270. The NFC subsystem 270 is configured to communicate with other electronic devices 201 and/or tags, using an NFC communications protocol. NFC is a set of short-range wireless technologies which typically require a distance of 4 cm or less for communications. The NFC subsystem 270 may include an NFC chip and an NFC antenna.

In some embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a common user interface (UI) mode between the electronic device 201 and another electronic device. In at least some embodiments, the short-range communication subsystem 262 is a wireless bus protocol compliant communication mechanism such as a Bluetooth® communication module to provide for communication with similarly-enabled systems and devices.

The electronic device 201 stores data 229 in an erasable persistent memory, which in one example embodiment is the flash memory 244. In various example embodiments, the data 229 includes service data including information required by the electronic device 201 to establish and maintain communication with the wireless network 101. The data 229 may also include user application data such as email messages, address book and contact information, calendar and schedule information, notepad documents, image files, and other commonly stored user information stored on the electronic device 201 by its user, and other data. The data 229 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker(s) 256 and signals for transmission would be generated by a transducer such as the microphone 258. The telephony functions are provided by a combination of software/firmware (i.e., a voice communication module) and hardware (i.e., the microphone 258, the speaker(s) 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225. The software applications 225 on the electronic device 201 may include a range of applications, including for example, a notepad application, Internet browser application, voice communication (i.e. telephony) application, mapping application, or a media player application, or any combination thereof. The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Figure 2:
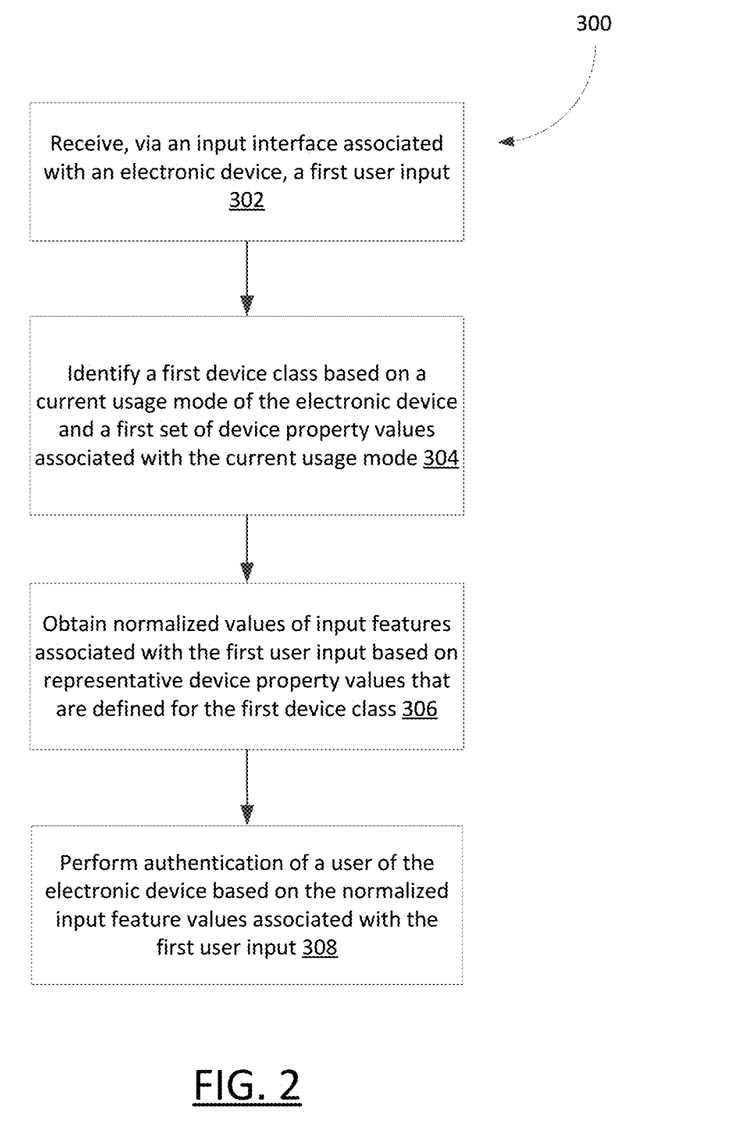
FIG. 2 shows, in flowchart form, an example method for authenticating a user on an electronic device based on passive biometrics.

Reference is made to FIG. 2 which shows, in flowchart form, an example method 300 for authenticating a user on an electronic device based on passive biometrics. The method 300 may be implemented by a computing device as part of a process for authenticating users on an electronic device based on passive biometrics. For example, an electronic device, such as the electronic device 201 of FIG. 1, may itself be configured to implement the method 300 for user authentication on the electronic device. As another example, a server (such as a device management server) that is communicably coupled to an electronic device may implement the method 300 for making user authentication decisions in respect of the electronic device.

Operations starting with operation 302 and continuing onward are performed by the processor of a computing device (such as the electronic device 201 of FIG. 1) executing software comprising instructions such as may be stored in the memory of the computing device. More particularly, processor-executable instructions may, when executed, configure a processor of a computing device to perform the method 300.

In operation 302, the processor receives, via an input interface associated with an electronic device, a first user input. The first user input may, for example, be a touch gesture input. The touch gesture input may be received at a touch-enabled input device, such as a touchscreen display or touchpad of the electronic device. Alternatively, the first user input may be an input on an external input device (e.g. keyboard, mouse, etc.) or an integrated input interface (e.g. a built-in keyboard or mouse-equivalent based on touchpad or directional input, microphone, etc.) associated with the electronic device. Depending on the type of input, the first user input may define motion vectors, orientation angles, typing speed, etc. which represent biometric identifiers of the user associated with the first user input.

In operation 304, the processor identifies a first device class based on a current usage mode of the electronic device and a first set of device property values associated with the current usage mode of the electronic device. The device property values and the current usage mode may be captured as part of the biometric input collection step of operation 302. That is, the processor may obtain the current usage mode of the electronic device and the associated device property values at the time of receiving the first user input. As an example, the device properties for which values are obtained may include physical properties of the electronic device (e.g. the dimensions of a display or an input area, etc.). As another example, the device properties may relate to input devices (e.g. keyboard, mouse, etc.) associated with the electronic device. The device property values may indicate whether the input device is internal or external to the electronic device, and the sensitivity settings associated with the input device.

The first device class represents an "abstracted" device class to which the electronic device may be mapped such that inputs on the electronic device can be normalized based on defined device property values associated with the first device class. In at least some embodiments, the first device class may be one of a set of predefined abstracted device classes for the particular type of the electronic device. For example, if the electronic device is a smartphone or tablet device, the first device class may be selected from a small number of abstracted device classes that are defined for mobile devices. The abstracted device classes may be defined, for example, based on the variant properties of input area dimensions (i.e. maximum height and width of input area for the touchscreen) and/or support for force sensing on the touchscreen. An example set of abstracted device classes for mobile devices may be defined as follows:

Class 1: {MAX_X: 480, MAX_Y: 800; FORCE: True}
Class 2: {MAX_X: 1440, MAX_Y: 2560; FORCE: True}
Class 3: {MAX_X: 2048, MAX_Y: 2732; FORCE: True}
Class 4: {MAX_X: 480, MAX_Y: 800; FORCE: False}
Class 5: {MAX_X: 1440, MAX_Y: 2560; FORCE: False}
Class 6: {MAX_X: 2048, MAX_Y: 2732; FORCE: False} where "MAX_X" is an integer property that defines range of possible x-values for inputs (e.g. touch gesture or mouse movements), "MAX_Y" is an integer property that defines range of possible y-values for inputs, and "FORCE" is a Boolean property that defines whether hardware of the electronic device supports force measurements as part of processing of touch gesture inputs. The abstracted device classes may be defined based on, for example, most common view sizes associated with modern mobile devices.

The selection of the first device class from among the set of abstracted device classes may be based on comparing the device property values associated with the current usage mode of the electronic device with corresponding ones of the representative device property values of the device class. In particular, one of the abstracted device classes which is determined to be the most similar class for the electronic device based on the comparison may be selected as the first device class. The comparison of device property values and determination of similarity will be described in greater detail below with respect to method 400 of FIG. 3 and method 500 of FIG. 4.

In operation 306, the processor obtains normalized values of input features associated with the first user input. The "raw" input feature values may include, for example, x- and y-components (i.e. directional components) of motion vectors that are defined by touch gesture inputs on the electronic device. These input feature values are normalized based on representative device property values that are defined for the selected device class (i.e. first device class). For example, if the "MAX_X" value is 1000 and "MAX_Y" value is 800 for then-current usage mode of the electronic device, all input features having x- or y-value dependency may be normalized.

In this way, the processor performs normalization of user inputs that are received at the electronic device. In at least some embodiments, the normalized input feature values associated with received user inputs are used as training data for a learning model associated with the first device class. That is, once the abstracted device class for the current usage mode of the electronic device is determined, the inputs of a particular user on the electronic device are used to train a learning model associated with the first device class for that user. The aggregate of all inputs of the user that map to this device class, irrespective of the particular device, OS, and/or usage mode that generates the inputs, may be used for training the learning model. The processor may then perform prediction against the trained learning model, for example for the purposes of identity verification and/or access control for the user. In particular, the learning model for the abstracted device class may be used across different devices, OS, etc. for authenticating the user.

In operation 308, the processor performs authentication of a user of the electronic device based on the normalized input feature values associated with the first user input. In some embodiments, the normalized input feature values for users may be used as training data for machine learning models that are specific to the abstracted device classes for those users. More particularly, the input feature values of inputs by an authorized user on an electronic device may be normalized and used to train a learning model that is associated with the abstracted device class to which the electronic device is mapped. That is, the normalized inputs may be used to train a single model for the abstracted device class based on aggregate of all user inputs that mapped to that class. In this way, a limited number of learning models (corresponding to abstracted device classes) may need to be trained for a particular user of electronic devices of a particular type (e.g. mobile devices). These learning models may be useful, for example, when a user acquires a new device of the same type, as they can use pre-existing models of authentication without requiring device-specific retraining.

Figure 3:
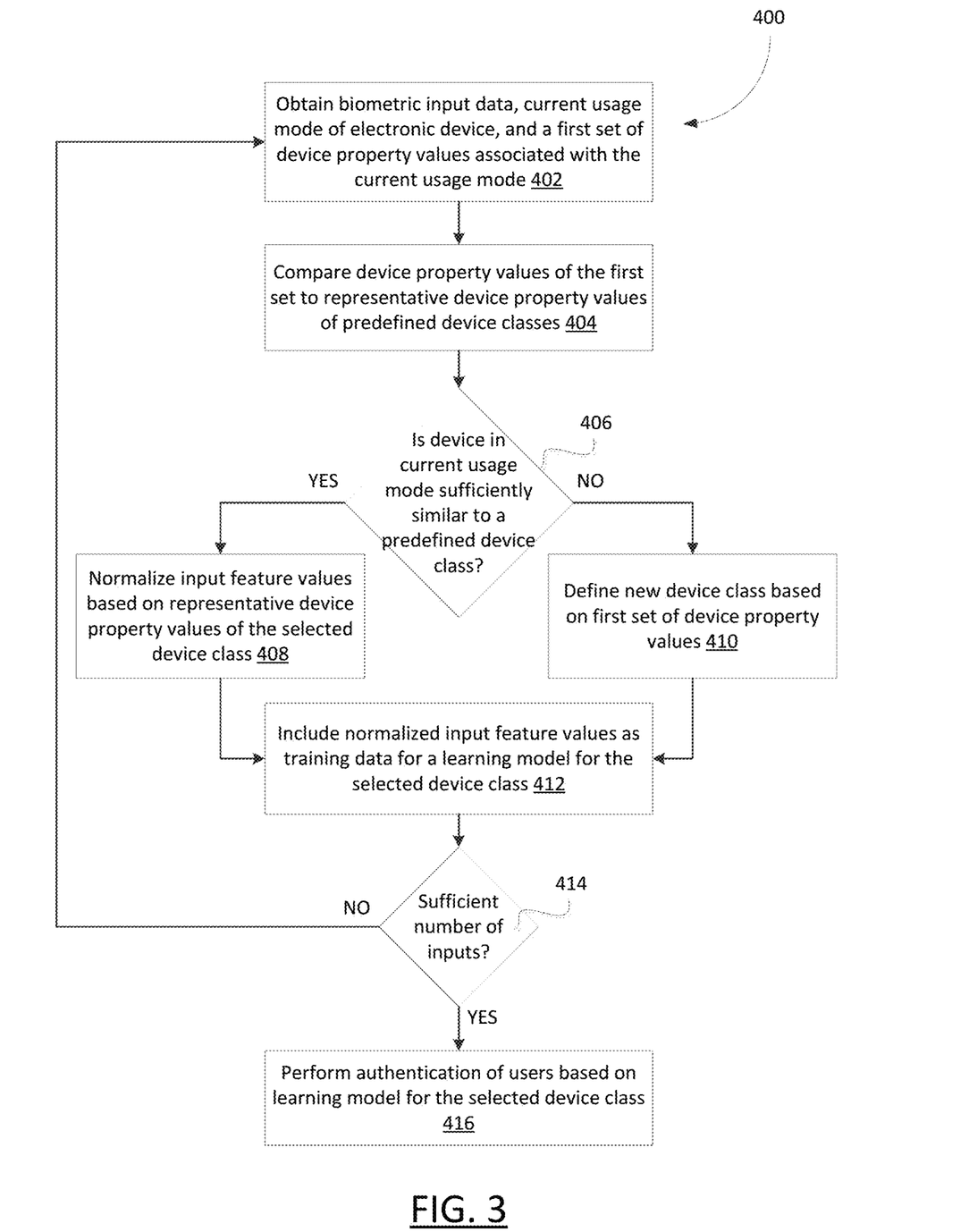
FIG. 3 shows, in flowchart form, another example method for authenticating a user on an electronic device based on passive biometrics.

Reference is made to FIG. 3 which shows, in flowchart form, another example method 400 for authenticating a user on an electronic device based on passive biometrics. The method 400 may be implemented by a computing device as part of a process for authenticating users on an electronic device based on passive biometrics. For example, an electronic device, such as the electronic device 201 of FIG. 1, may itself be configured to implement the method 400 for user authentication on the electronic device. As another example, a server (such as a device management server) that is communicably coupled to an electronic device may implement the method 400 for making user authentication decisions in respect of the electronic device.

Operations starting with operation 402 and continuing onward are performed by the processor of a computing device (such as the electronic device 201 of FIG. 1) executing software comprising instructions such as may be stored in the memory of the computing device. More particularly, processor-executable instructions may, when executed, configure a processor of a computing device to perform the method 400. The operations of method 400 may be performed in addition to, or as alternatives, to one or more of the operations of method 300.

In operation 402, the processor obtains biometric input data, the current usage mode of the electronic device, and a first set of device property values associated with the current usage mode. For example, when a user input is received at an input interface, such as a display device, associated with the electronic device, the current usage mode (e.g. a current orientation, windowed or full-screen mode, etc.) of the electronic device may be determined and the device property values associated with said usage mode may be obtained by the processor.

In operation 404, the processor compares device property values of the first set to representative device property values of one or more predefined device classes. When identifying a suitable abstracted device class to which the electronic device can be mapped, the processor may compare the first set of device property values associated with the current usage mode of the electronic device to corresponding ones of the representative device property values of one or more of predefined device classes. The comparison of the device property values may be performed using suitable metrics based on whether the values for each property are represented as a continuous, discretized, ranged, categorical, or Boolean variable.

In operation 406, the processor determines whether the electronic device, in current usage mode, is sufficiently similar to any one of the one or more predefined device classes. If the current usage mode is sufficiently similar to at least one of the predefined device classes, the processor normalizes input feature values based on representative device property values of a select device class, in operation 408.

If, on the other hand, the current usage mode of the electronic device is not sufficiently similar to any of the predefined device classes, the processor defines a new abstracted device class based on the first set of device property values, in operation 410. In at least some embodiments, the new class is defined based on the current usage mode of the electronic device and the set of device property values associated with said current usage mode.

In operation 412, the processor includes the normalized input feature values as training data for a learning model for the selected device class. As described above, the learning model may be trained using the aggregate of inputs by the user that map to the selected device class. In at least some embodiments, a minimal number of training inputs may be required before the learning model can be deemed to be sufficiently trained (for example, for prediction against the learning model). That is, the learning model may be associated with a threshold value identifying a minimum number of normalized inputs by the user (across devices and usage modes that map to the selected device class) that are required before the learning model can be used for prediction purposes. The processor may thus determine whether a sufficient number of normalized inputs have been received, in operation 414. For example, the processor may compare a current number of received normalized input values for the selected device class against a predefined threshold minimum value. The comparison may be performed by the processor itself, or the processor may query a remote computing system to check whether a sufficient number of inputs have been received for the learning model. If the learning model has insufficient number of normalized inputs, the processor may return to operation 402 and attempt to obtain additional input data which may be used for training the learning model.

In some embodiments, the processor may perform certain additional checks on user inputs before they are included as training data for a learning model associated with the selected device class. For example, a user input on a device that maps to the selected device class may be accepted as training data if the learning model itself predicts the input to have been generated by an authorized, or "target", user for the learning model. As another example, the processor may issue an active authentication challenge to a user during use of a device. If the user passes the active authentication check (e.g. by inputting correct authentication information), the input(s) of the user may be received as training data for the learning model. In this way, the learning model is able to update on a continuous basis, but only based on user inputs that are deemed to be valid inputs, either through initial passive authentication prediction or subsequent successful active authentication challenges, of the target user.

In response to determining that a sufficient number of normalized inputs have been received, the processor performs authentication of users based on the learning model for the selected device class, in operation 416. That is, if the learning model for the selected device class is determined to be sufficiently trained, the processor performs authentication based on the learning model. More generally, the processor performs user authentication based on historical input feature values data associated with the first device class for one or more authorized users of the electronic device. The historical input feature values data may, in some embodiments, comprise a model that is trained using normalized input feature values associated with inputs by the authorized users as training data. In some embodiments, the authentication may be performed continuously. In some other embodiments, the authentication may be performed in response to an explicit request for authentication of a user on the electronic device.

Figure 4:
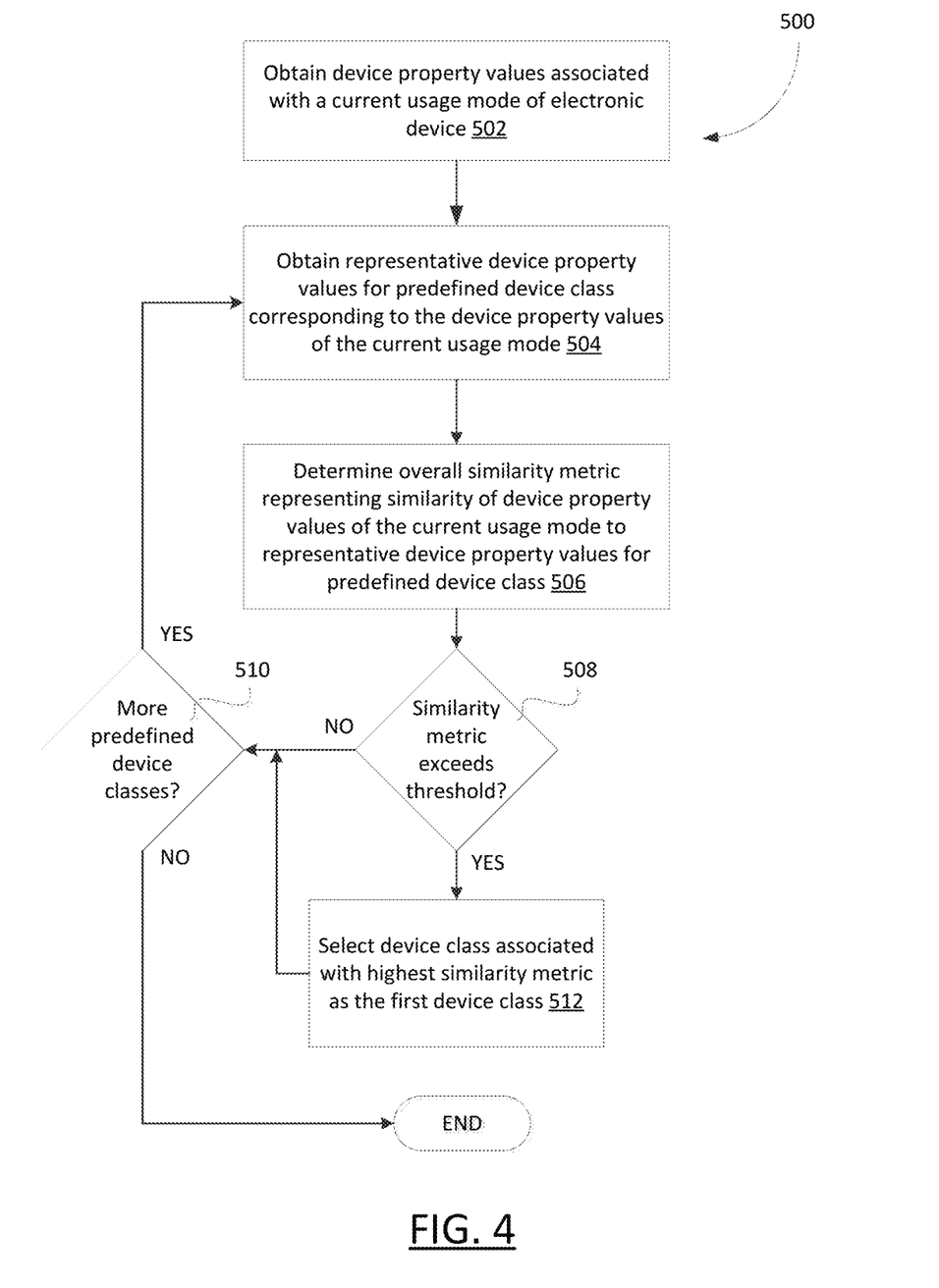
FIG. 4 shows, in flowchart form, an example method for identifying an abstracted device class corresponding to a current usage mode of an electronic device.

Reference is made to FIG. 4 which shows, in flowchart form, an example method 500 for identifying an abstracted device class corresponding to a current usage mode of an electronic device. The method 500 may be implemented by a computing device as part of a process for authenticating users on an electronic device based on passive biometrics. For example, an electronic device, such as the electronic device 201 of FIG. 1, may itself be configured to implement the method 500 for user authentication on the electronic device. As another example, a server (such as a device management server) that is communicably coupled to an electronic device may implement the method 500 for making user authentication decisions in respect of the electronic device.

Operations starting with operation 502 and continuing onward are performed by the processor of a computing device (such as the electronic device 201 of FIG. 1) executing software comprising instructions such as may be stored in the memory of the computing device. More particularly, processor-executable instructions may, when executed, configure a processor of a computing device to perform the method 500. The operations of method 500 may be performed in addition to, or as alternatives, to one or more of the operations of methods 300 and 400.

In operation 502, the processor obtains device property values associated with a current usage mode of the electronic device. The device property values, along with indications of the current usage mode, may be obtained, for example, when a user input is received at an input interface associated with the electronic device. In particular, the current usage mode and the device property values may correspond to the time of receipt of a user input on the electronic device.

In operation 504, the processor obtains representative device property values for a predefined device class corresponding to the device property values of the current usage mode. The representative device property values may be predefined for a limited number of abstracted device classes for the type of the electronic device and stored in a database that is accessible by the processor (e.g. stored in memory of the electronic device or remotely at a device management server), or they may be defined dynamically as inputs are received.

In operation 506, the processor calculates an overall similarity metric representing similarity of the device property values associated with the current usage mode of the electronic device to representative device property values for the predefined device class. In at least some embodiments, for each class-defining property, the device property value associated with the current usage mode may be compared to the corresponding class value (i.e. representative device property value) for the predefined device class. Depending on the type of each class-defining property, a different metric may be used for the respective comparisons. The overall similarity metric may, in some embodiments, be a sum over all calculated similarity measures for each of the class-defining properties. Alternatively, the overall similarity metric may be the maximum of all of the calculated similarity measures, or a weighted sum of measures if one or more properties are deemed to be more important than others. For example, if many more features have x-dependency that would be influenced by normalization, similarity with respect to MAX_X property may be deemed more important than similarity with respect to FORCE property.

In operation 508, the processor determines whether the similarity metric for the predefined device class exceeds a predefined threshold value. The threshold value may, in some embodiments, be between 0.7 and 0.9 (and generally will be greater than 0.5). If the similarity metric does not exceed the predefined threshold value, the processor determines whether there are other predefined device classes for comparing, in operation 510. In response to determining that there are other predefined device classes, the processor returns to operation 504 and obtains representative device property values for a different predefined device class. In this way, the processor may iterate through a set of abstracted device classes that are defined for the type associated with the electronic device and calculate overall similarity metric values. The calculated similarity metrics can then be compared against the predefined threshold.

If, on the other hand, the similarity metric does exceed the threshold value, the predefined device class is determined to be a candidate device class for selection as the most suitable device class for the electronic device (i.e. the "first device class"). In operation 512, the processor selects the device class that is associated with the highest similarity metric as the first device class. If there are other predefined device classes for comparing, the processor returns to operation 504 to evaluate similarity of the other predefined device class(es) to the electronic device in its current usage mode.

Figure 5:
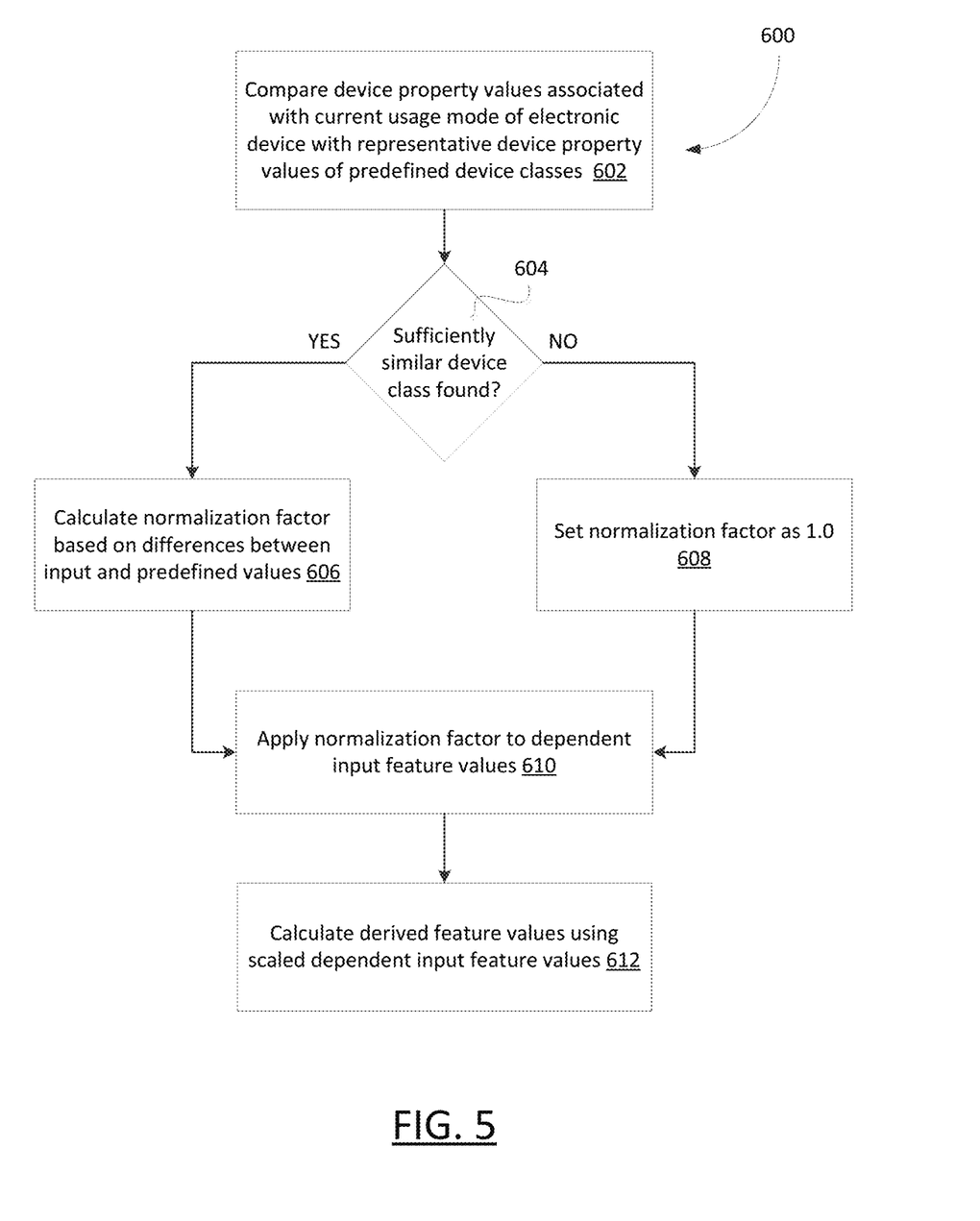
FIG. 5 shows, in flowchart form, an example method for obtaining normalized input feature values associated with a user input.

Reference is made to FIG. 5 which shows, in flowchart form, an example method 600 for obtaining normalized input feature values associated with a user input. The method 600 may be implemented by a computing device as part of a process for authenticating users on an electronic device based on passive biometrics. For example, an electronic device, such as the electronic device 201 of FIG. 1, may itself be configured to implement the method 600 for user authentication on the electronic device. As another example, a server (such as a device management server) that is communicably coupled to an electronic device may implement the method 600 for making user authentication decisions in respect of the electronic device.

Operations starting with operation 602 and continuing onward are performed by the processor of a computing device (such as the electronic device 201 of FIG. 1) executing software comprising instructions such as may be stored in the memory of the computing device. More particularly, processor-executable instructions may, when executed, configure a processor of a computing device to perform the method 600. The operations of method 600 may be performed in addition to, or as alternatives, to one or more of the operations of methods 300, 400 and 500.

In operation 602, the processor compares device property values associated with a current usage mode of the electronic device with representative device property values of one or more predefined device classes. In operation 604, the processor determines whether a sufficiently similar device class for the electronic device in its current usage mode is found. The comparison of the device property values may be performed in accordance with the techniques described above with respect to method 400 of FIG. 3 and method 500 of FIG. 4.

Upon selection of a suitable device class for the electronic device, the processor obtains normalized input features values associated with a user input. Specifically, feature scaling of raw input feature values is performed, by normalizing the range of independent variables associated with the user inputs. If the processor determines that there is a sufficiently similar device class from the set of predefined device classes, the processor derives a normalization factor. More particularly, in operation 606, the processor calculates a normalization factor based on differences between the device property values associated with a current usage mode of the electronic device and representative device property values of a select predefined device class. In some embodiments, each input feature value may be normalized using a "Min-Max" normalization technique that is based on MIN and MAX values for the selected device class as appropriate to the feature. For example, if the selected device class has associated device properties values of {MIN_X=0, MAX_X=480, MIN_Y=0, MAX_Y=800}, the directional (i.e. x- and y-) components of touch gesture inputs may be normalized as follows:

$$\text{norm\_min\_max}(X) = (x - \text{MIN\_}X)/(\text{MAX\_}X - \text{MIN\_}X)$$
$$= x/480$$

$$\text{norm\_min\_max}(Y) = (y - \text{MIN\_}Y)/(\text{MAX\_}Y - \text{MIN\_}Y)$$
$$= y/800$$

If, on the other hand, the processor determines that there is no sufficiently similar device class for the electronic device in its current usage mode, the processor sets the normalization factor as 1.0, in operation 608. In operation 610, the processor applies the normalization factor to dependent input feature values. For example, the components of motion vectors associated with touch gesture inputs, which depend on the scaled x- and y-values, may be determined as a result of applying the normalization factor.

In operation 612, the processor calculates derived feature values using scaled dependent input feature values. For example, derived feature values, such as acceleration, curvature, drift, etc., may be calculated based on the scaled dependent input feature values.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computer-implemented method, comprising:
   receiving, via an input interface associated with an electronic device, a first touch gesture input;
   determining a first device class associated with the electronic device based on:
      comparing a first set of device property values associated with a current usage mode of the electronic device with corresponding representative device property values of one or more predefined device classes; and
      selecting a most similar one of the predefined device classes for the electronic device as the first device class based on the comparing,
   obtaining normalized values of motion vector components associated with the first touch gesture input, the motion vector component values being normalized using predefined representative device property values associated with the first device class; and
   performing authentication of a user of the electronic device based on the normalized motion vector component values associated with the first touch gesture input.

2. The method of claim 1, wherein determining the first device class further comprises:
   for each of the predefined device classes, obtaining a similarity metric value representing overall similarity between the first set of device property values associated with the current usage mode of the electronic device and corresponding representative device property values of the device class based on the comparing; and
   selecting a device class associated with the highest similarity metric value as the first device class.

3. The method of claim 1, wherein determining the first device class comprises:
   determining that the first set of device property values associated with the current usage mode of the electronic device are not sufficiently similar to corresponding representative device properties of any one of the predefined device classes;
   defining a new device class based on the current usage mode of the electronic device and the first set of device property values associated with the current usage mode of the electronic device; and
   selecting the newly defined device class as the first device class.

4. The method of claim 1, wherein the input interface comprises a display device and wherein the current usage mode of the electronic device comprises at least one of:
   a current orientation of a display device; or
   one of windowed mode or full-screen mode for the display device.

5. The method of claim 1, wherein the input interface comprises a display device and wherein the first set of device property values comprises maximum width and height of an input area of the display device in the current usage mode of the electronic device.

6. The method of claim 1, wherein the authentication is performed based on historical input feature values data associated with the first device class for one or more authorized users of the electronic device.

7. The method of claim 6, wherein the historical input feature values data for an authorized user of the electronic device comprises a model that is trained using normalized motion vector component values associated with inputs by the authorized user as training data.

8. The method of claim 1, wherein the authentication is performed continuously or in response to a request for authentication of a user on the electronic device.

9. An electronic device, comprising:
   a memory;
   an input interface;
   a processor coupled to the memory and the input interface, the processor being configured to:
      receive, via an input interface associated with an electronic device, a first touch gesture input;
      determine a first device class associated with the electronic device based on:
         comparing a first set of device property values associated with a current usage mode of the electronic device with corresponding representative device property values of one or more predefined device classes; and
         selecting a most similar one of the predefined device classes for the electronic device as the first device class based on the comparing,
      obtain normalized values of motion vector components associated with the first touch gesture input, the motion vector component values being normalized using predefined representative device property values associated with the first device class; and
      perform authentication of a user of the electronic device based on the normalized motion vector component values associated with the first touch gesture input.

10. The electronic device of claim 9, wherein determining the first device class further comprises:
    for each of the predefined device classes, obtaining a similarity metric value representing overall similarity between the first set of device property values associated with the current usage mode of the electronic device and corresponding representative device property values of the device class based on the comparing; and selecting a device class associated with the highest similarity metric value as the first device class.

11. The electronic device of claim 9, wherein determining the first device class comprises:

determining that the first set of device property values associated with the current usage mode of the electronic device are not sufficiently similar to corresponding representative device properties of any one of the predefined device classes;

defining a new device class based on the current usage mode of the electronic device and the first set of device property values associated with the current usage mode of the electronic device; and selecting the newly defined device class as the first device class.

12. The electronic device of claim 9, wherein the input interface comprises a display device and wherein the current usage mode of the electronic device comprises at least one of:

a current orientation of a display device; or one of windowed mode or full-screen mode for the display device.

13. The electronic device of claim 9, wherein the input interface comprises a display device and wherein the first set of device property values comprises maximum width and height of an input area of the display device in the current usage mode of the electronic device.

14. The electronic device of claim 9, wherein the authentication is performed based on historical input feature values data associated with the first device class for one or more authorized users of the electronic device.

15. The electronic device of claim 14, wherein the historical input feature values data for an authorized user of the electronic device comprises a model that is trained using normalized motion vector component values associated with inputs by the authorized user as training data.

16. The electronic device of claim 9, wherein the authentication is performed continuously or in response to a request for authentication of a user on the electronic device.

17. One or more non-transitory computer-readable media storing instructions that, when executed by a processor, cause the processor to perform operations comprising:

receiving, via an input interface associated with an electronic device, a first touch gesture input;

determining a first device class associated with the electronic device based on:

comparing a first set of device property values associated with a current usage mode of the electronic device with corresponding representative device property values of one or more predefined device classes; and selecting a most similar one of the predefined device classes for the electronic device as the first device class based on the comparing, obtaining normalized values of motion vector components associated with the first touch gesture input, the motion vector component values being normalized using predefined representative device property values associated with the first device class; and performing authentication of a user of the electronic device based on the normalized motion vector component values associated with the first touch gesture input.

* * * * *